United States Patent
Edwards et al.

[11] Patent Number: 6,041,610
[45] Date of Patent: Mar. 28, 2000

[54] OPTICAL REFRIGERATOR USING REFLECTIVITY TUNED DIELECTRIC MIRRORS

[75] Inventors: Bradley C. Edwards, Los Alamos; Melvin I. Buchwald; Richard I. Epstein, both of Santa Fe, all of N.Mex.

[73] Assignee: The Regents of the University of California, Los Alamos, N.Mex.

[21] Appl. No.: 09/289,419

[22] Filed: Apr. 9, 1999

Related U.S. Application Data

[60] Provisional application No. 60/081,367, Apr. 10, 1998.

[51] Int. Cl.[7] .................................................. F25D 23/00
[52] U.S. Cl. .................................. 62/264; 62/3.1; 62/467
[58] Field of Search .............................. 62/3.1, 264, 467

[56] References Cited

U.S. PATENT DOCUMENTS

| | | | |
|---|---|---|---|
| 5,447,032 | 9/1995 | Epstein et al. | 62/3.1 |
| 5,615,558 | 4/1997 | Cornell et al. | 62/264 |
| 5,626,020 | 5/1997 | Sangster et al. | 62/264 |

OTHER PUBLICATIONS

C. E. Mungan et al., "Laser Cooling of a Solid by 16 K Starting from Room Temperature," Phys Rev. Lett. 78, 1030 (1997).
J.L. Clark and G. Rumbles, "Laser Cooling in the Condensed Phase by Frequency Up–Conversion," Phys. Rev. Lett. 76, 2037 (1996).
Richard I. Epstein et al., "Observation of Laser–Induced Fluorescent Cooling of a Solid," Nature 377, 500 (1995).
Conference Record of the Twenty First IEEE Photovoltaic Specialist Conference—1990, vol. 1, Kissimimee, Florida, May 21–25, 1990.
"Efficiency Increased in Aluminum–Free Devices," Laser Focus World 33, 15 (Jan. 1997).

*Primary Examiner*—Ronald Capossela
*Attorney, Agent, or Firm*—Samuel M. Freund

[57] ABSTRACT

Optical refrigerator using reflectivity-tuned dielectric mirrors. Selected working materials can be optically pumped using monochromatic radiation such that the resulting fluorescence has an average photon energy higher than that of the pumping radiation; that is, net anti-Stokes fluorescence. If the quantum efficiency is sufficiently high, the working material will cool and optical refrigeration can be achieved. Parallel mirrored faces are employed to increase the optical path of the incident pumping radiation within the working material by multiple reflections. Reflectivity-tuned dielectric mirrors which allow higher-energy fluorescence photons to readily escape from the working material while inhibiting the escape of the lower-energy photons which are consequently partially trapped in the working material and ultimately reabsorbed and refluoresced at higher energies are employed. This increases the optical refrigerator efficiency. An efficient geometry for the cooling material is a disk having a large diameter and a small height, since the fluorescence can predominantly escape through the tuned mirror on one end face of the working material. An alternative cooling element could be approximately cubic with tuned mirrors on the sides as well as on one end. In another embodiment of the invention, photocells are used to convert escaping fluorescence energy into electricity, thereby reducing the power requirements of the optical refrigerator and reducing the amount of waste that must be removed from the vicinity of the working material.

13 Claims, 8 Drawing Sheets

OPTICAL REFRIGERATOR USING REFLECTIVITY TUNED DIELECTRIC MIRRORS

This application claims the benefit of U.S. Provisional Application No. 60/081,367, filed Apr. 10, 1998.

FIELD OF THE INVENTION

The present invention relates generally to laser-induced optical refrigeration using a working material having net anti-Stokes fluorescence and, more particularly, to optical refrigeration using reflectivity-tuned dielectric mirrors to shift the fluorescence spectrum to higher energies, thereby increasing refrigerator efficiency. This invention was made with government support under Contract No. W-7405-ENG-36 awarded by the U.S. Department of Energy to The Regents of the University of California. The government has certain rights in the invention.

BACKGROUND OF THE INVENTION

The basic cooling mechanism of a fluorescent refrigerator requires a working material to absorb substantially monochromatic electromagnetic radiation at one frequency and then emit fluorescent radiation that has, on the average, a higher frequency. More energy is thereby removed from the working material than is introduced into the material, the difference between the output energy flux and the input energy flux being supplied by the thermal energy of the working material. Recent laboratory measurements have demonstrated laser-induced optical refrigeration in both solids and liquids. See, e.g., C. E. Mungan et al., Phys. Rev. Lett. 78, 1030 (1997) and J. L. Clark and G. Rumbles, Phys. Rev. Left. 76, 2037 (1996), respectively.

In U.S. Pat. No. 5,447,032 for "Fluorescent Refrigeration" which issued to Richard I. Epstein et al. on Sep. 5, 1995, one embodiment of an optical refrigerator is described. Therein, the working material is a cylinder with two opposing faces coated with a high-reflectivity dielectric mirror. Laser light enters through a small hole in one of the mirrors and is trapped in the material by reflection from the mirrors and by internal reflection from the other sides of the cylinder. The pump light is eventually absorbed by the working material which then fluoresces at higher energy. Ideally, the fluorescence escapes carrying heat from the working material. The object to be cooled is placed in thermal contact with the second of the mirrors, so that it is both shaded from the escaping fluorescent radiation and does not absorb the laser light.

Efficiency and power of an optical refrigerator are limited by radiation transfer effects. That is, some of the fluorescence radiation is reabsorbed by the cooling material, thereby changing the spectrum of the energy that ultimately escapes. Such reabsorption shifts the escaping fluorescent photons to lower energies, degrading the refrigerator performance. If the fluorescent quantum efficiency is sufficiently high, however, the solid will cool. R. I. Epstein et al. in Nature 377, 500 (1995) demonstrate that a solid may be optically pumped using monochromatic radiation such that the resulting fluorescence has an average photon energy higher than that of the pump radiation. This first experimental verification of cooling used a rectangular block of ytterbium-doped metal fluoride glass ($Yb^{3+}$-doped ZBLANP, a heavy metal fluoride glass containing zirconium, barium, lanthanum, aluminum, sodium and lead) and displayed a 2% cooling efficiency. Optical refrigeration can therefore be used to produce a practical optical refrigerator using currently available solid-state technology which would produce no vibrations and neither generate nor be affected by electromagnetic interference. It is estimated by the authors that, by using $^{3+}$-doped ZBLANP, this device would cool to $\leq 77$ K from room temperature, convert ~0.5% of the applied electric power to heat lift at 77 K, weigh less than 2 kg per watt of cooling power, and have many years of continuous operating lifetime.

The cooling efficiency of a fluorescent refrigerator is enhanced if the difference between the frequencies of pump radiation and the mean fluorescent radiation is increased. This also decreases the waste heat that has to be removed and allows optical refrigerators to operate at high powers. Conversely, if the fluorescence is shifted to lower frequencies, the cooling efficiency decreases.

Accordingly, it is an object of the present invention to shift the fluorescence spectrum of an optical refrigerator to higher energies, thereby improving refrigerator efficiency.

Another object of the present invention is to shift the fluorescence spectrum of an optical refrigerator by modifying the shape of the cooling element and by tuning the wavelength dependence of the reflectivity of dielectric mirrors employed for this purpose.

Yet another object of the invention is to convert the escaping fluorescence radiation to electrical power, thereby increasing the cooling efficiency.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the cooling apparatus hereof may include a source of substantially monochromatic light having a chosen wavelength; a working material having atoms with energy levels such that a small number of energy levels in an excited state thereof are directly excited by the chosen wavelength of light from the ground energy level of the atoms, such that the energy levels in the excited state which are not directly excited have an energy spacing which permits thermal redistribution, and such that fluorescence to the ground state can preferentially occur from the thermally redistributed energy levels, whereby the average fluorescence wavelength to the ground-state level is shorter than the chosen wavelength of light. The working material has first and second flat, spaced-apart, substantially parallel dielectric-coated faces separated such that the optical depth for the fluorescence therebetween is small. The dielectric coating on the first face is highly reflective for the chosen wavelength of the pump light while having significant transmission for the shorter fluorescence wavelengths and high reflectivity for the longer wavelengths thereof, while the dielectric coating on the second face is highly reflective at wavelengths which include that of the chosen pump wavelength of light and all the wavelengths of the fluorescence. The pump light is directed into the working material through an uncoated portion of the first face such that the optical pathlength of the pump light within the working material between the faces is large as a result of multiple reflections of the light between the dielectric coatings. The object to be cooled is placed in thermal contact with the dielectric coating on the second face of the working material.

It is preferred that the object to be cooled and the working material are thermally isolated from external heat sources.

Preferably, the working material is cylindrical in shape with tuned mirrors on the parallel ends thereof, or cubic in shape with tuned mirrors on the sides as well as the end faces.

It is also preferred that the ratio of the diameter to the height of the cylinder is greater than about five.

Preferably also, the fluorescent radiation exiting the working material is absorbed by photocells for converting the fluorescence energy into electricity.

Benefits and advantages of the present invention include a cryocooler that can be fully solid-state, which has substantial cooling efficiency, and which is vibration-free.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION

Figure 1:
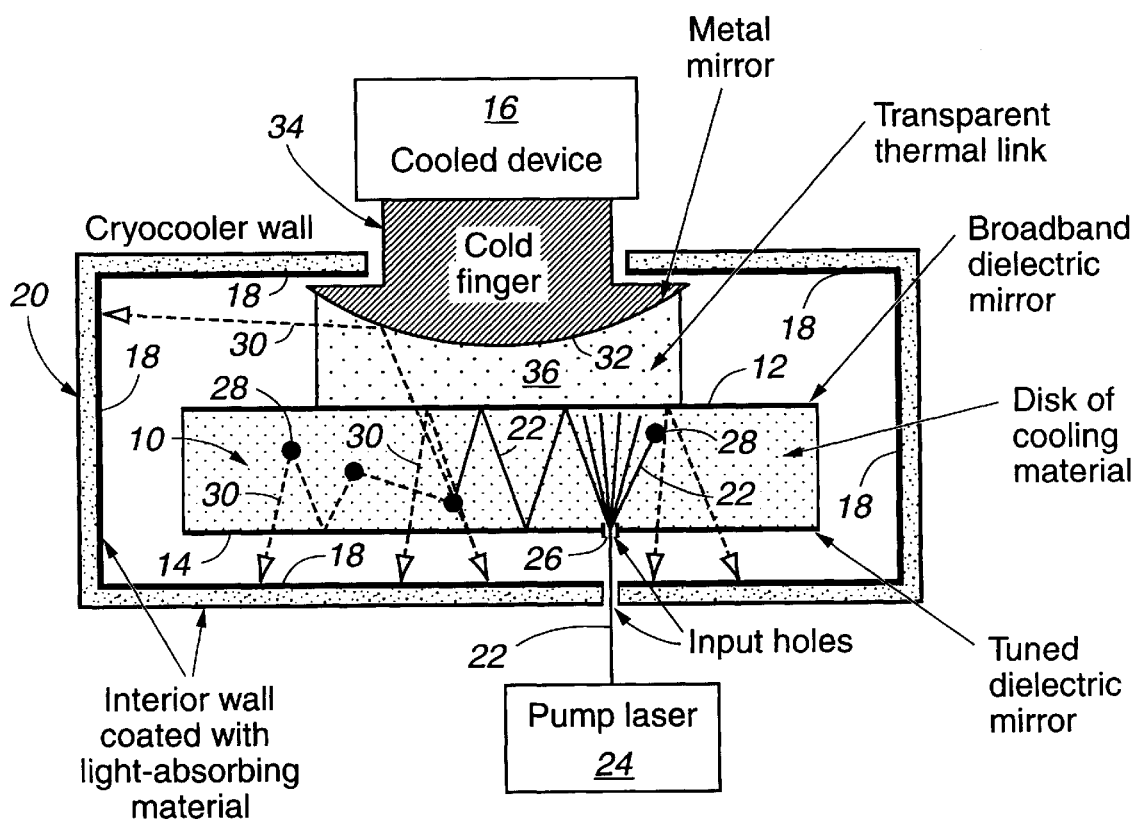
FIG. 1 is a schematic representation of a side view of one embodiment of the optical refrigerator of the present invention illustrating, in particular, the use of a reflectivity-tuned dielectric mirror on one face to permit the fluorescence radiation to escape from a thin cylinder of the working material, while trapping the pumping radiation inside of the working material, and while the mirror on the opposing face of the cylinder prevents the object being cooled from being exposed to either the fluorescence radiation or the pumping radiation.

Selected working materials can be optically pumped using monochromatic radiation such that the resulting fluorescence has an average photon energy higher than that of the pumping radiation; that is, net anti-Stokes fluorescence. If the quantum efficiency is sufficiently high, the working material will cool, and optical refrigeration can be achieved. U.S. Pat. No. 5,447,032, supra, the teachings of which are hereby incorporated by reference herein, describes the basic apparatus for achieving optical cooling. Specifically, the working material has two parallel mirror surfaces, the pumping radiation being introduced into the material through one surface. Briefly, the present invention includes the use of a reflectivity-tuned dielectric mirror in this basic apparatus in place of the mirror surface into which the radiation is introduced. The dielectric mirror is selected to allow higher-energy fluorescent photons to readily escape while inhibiting the escape of the lower-energy photons. That is, a higher-energy fluorescent photon emitted in the direction of the tuned mirror has a high probability of escaping the first time it reaches the surface. However, if the same photon is emitted in the direction of the second (broad-band) mirror, which reflects substantially all photons, the higher-energy photon will be reflected from that surface and eventually reach the tuned mirror through which the photon can escape the working material. Lower-energy fluorescent photons have a high likelihood of being reflected from either mirror. These lower-energy photons are thereby partially trapped in the working material and have a greater probability of being reabsorbed and refluoresced at higher energies. This increases the cooler efficiency. Since the fluorescence would predominantly escape through a tuned mirror on one end of the working material, an efficient geometry for the cooling material is a disk having a large diameter and a small height (the totally reflecting mirror at the other end, and the internal reflections from the side of the disk effectively preventing the fluorescence from escaping elsewhere). The working material can then be made as large as needed to accommodate the required cooling power. A highly thermally conducting layer, such as diamond, sapphire or a metallic layer, can be placed over the broad-band dielectric mirror to assist in transferring heat from the object to be cooled to the working material. The cooling efficiency for the specific case of a ytterbium-based cooler with mirrors tuned to allow escape of radiation of wavelengths shorter than 970 nm has been calculated to increase from 6% to about 9% at room temperature, from 2% to 5% at 100K, and from about 1.5% to 3% at 80K. These improvements will render optical refrigerators more efficient than commercially available small mechanical coolers, thereby greatly increasing the commercial potential of optical refrigerators.

Three considerations are utilized in determining the size and shape of the working material, and the characteristics of the reflectivity-tuned dielectric mirrors: (1) if the working material has the shape of a thin disk, the diameter-to-thickness ratio should be greater than approximately 5, the thickness being chosen so that the probability that a fluorescent photon is absorbed (optical depth) in traversing the thickness of the disk, is less than 0.4; (2) the dielectric mirror at one end of the disk (the end opposite that which the object to be cooled is attached) is tuned such that the reflectivity at the wavelength of the pump radiation is as high as possible ($\geq 0.999$) while the transmission for the high-energy portion of the fluorescence spectrum remains high ($\geq 80\%$) and the reflection at the low-energy portion of the fluorescence spectrum is high ($\geq 90\%$); and (3) the mirror on the end of the working material to which the object to be cooled is attached is a broad-band reflecting dielectric mirror.

Reference will now be made in detail to the present preferred embodiments of the invention, examples of which are illustrated in the accompanying drawings. Turning now to the Figures, similar or identical structure is identified by identical callouts. FIG. 1 is a schematic representation of a side view of one embodiment of the optical refrigerator of the present invention. Shown is disk-shaped cooling or working material, 10, having one dielectric mirror at each end, 12 and 14. Mirror 12 is a broadband mirror to reduce the amount of radiation impinging upon the object, 16, being cooled. Mirror 14 is reflectivity tuned to permit only the higher-energy fluorescence radiation to escape, thereby increasing the cooling efficiency of the refrigerator. The interior walls, 18, of cooling chamber, 20, are coated with a material that absorbs the fluorescence radiation and converts it into heat. The chamber walls, 18, include means (not shown in Figures) for removing waste heat; standard techniques are employed, for example, conduction, radiation, or heat pipes. Solid lines, 22, depict pump photons from laser, 24. The pump light enters the cooling material 10 through an input hole, 26, in mirror 14. These photons are reflected between the mirrors until they are absorbed (denoted by large black dots, 28). The fluorescence radiation is depicted by dashed lines, 30. If this radiation has sufficient energy, it can escape through the tuned mirror 14, or it can be reabsorbed. If the fluorescence has lower energy, it will be reabsorbed by the working material. A small quantity of the fluorescence radiation may leak through mirror 12 and be scattered to wall 18 by a mirrored surface, 32, on the base of the cold finger, 34, which is placed in thermal contact with the object to be cooled 16 through thermal link, 36. Little laser pump light exits through the uncoated side of the cylindrical working material because pump light 22 is internally reflected thereby since it is incident thereon at low angles.

Figure 2:
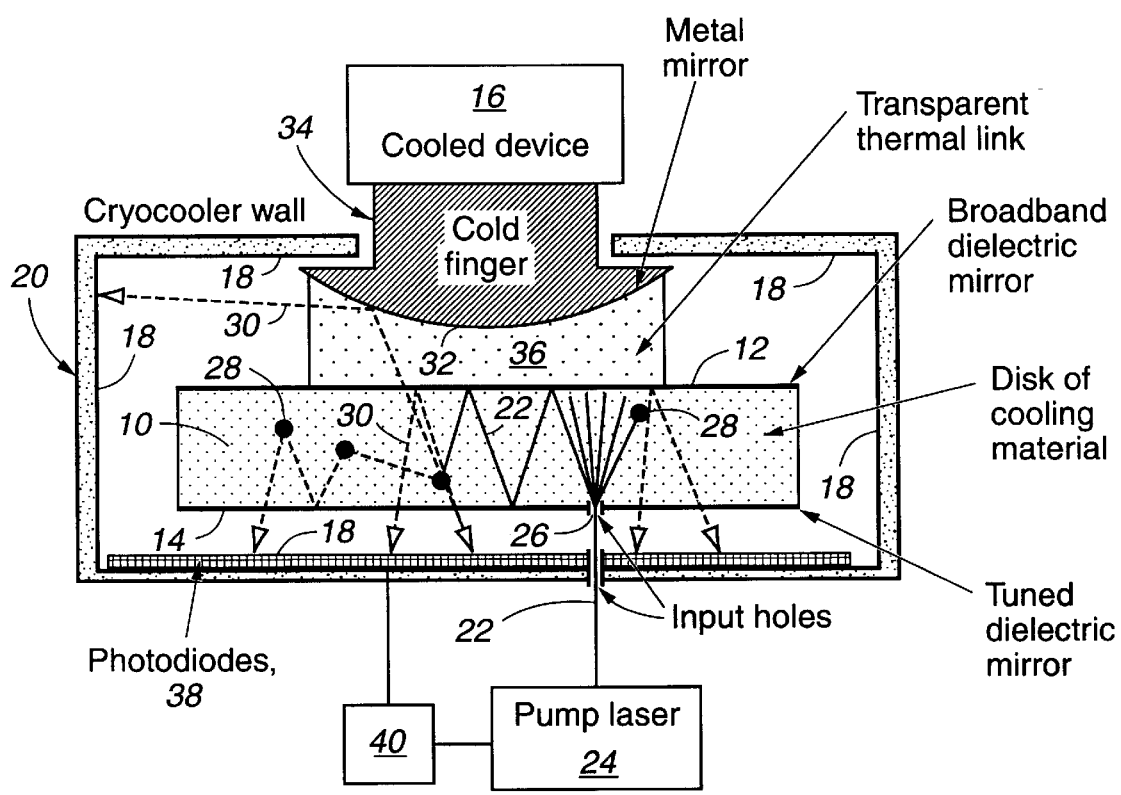
FIG. 2 is a schematic representation of a side view of a second embodiment of the present optical refrigerator which is similar to that shown in FIG. 1 hereof, except that photocells are disposed facing the reflectively-tuned dielectric mirror such that they intercept the fluorescence radiation exiting the working material and convert this energy into electricity, thereby increasing the efficiency of the optical cooler.

FIG. 2 is a schematic representation of a side view of a second embodiment of the optical cooler of the present invention, differing from FIG. 1 hereof in that the wall surface 18 opposite reflectivity-tuned mirror 14 is covered with photodiodes, 38. These photodiodes are utilized to convert the fluorescent radiation to electricity, thereby increasing the optical refrigerator's efficiency by absorbing waste fluorescent energy and serving as a source of electrical energy. That is, the amount of waste heat that must be removed from the chamber walls is reduced by the use of photocells since the fluorescence radiation is now absorbed by the photocells. In actual practice, it is anticipated that the chamber walls will include both highly reflective surface portions and portions covered with photocells. In this manner, some of the fluorescence radiation would directly impinge upon a photocell, and a significant fraction of its energy would be converted into electricity, while the remainder of the fluorescence would be reflected one or more times from a reflecting surface and ultimately impinge upon a photocell where it would generate electricity. The electrical power generated by the photocells can be used to augment the power used to drive the laser that generates the pump light for the optical refrigerator. Converter, 40, is schematically depicted as a device for accomplishing this. Therefore, the net "wall-plug" efficiency of the optical refrigerator can be significantly increased, and the waste heat generated at the laser and at the cooling chamber can be reduced.

Figure 3:
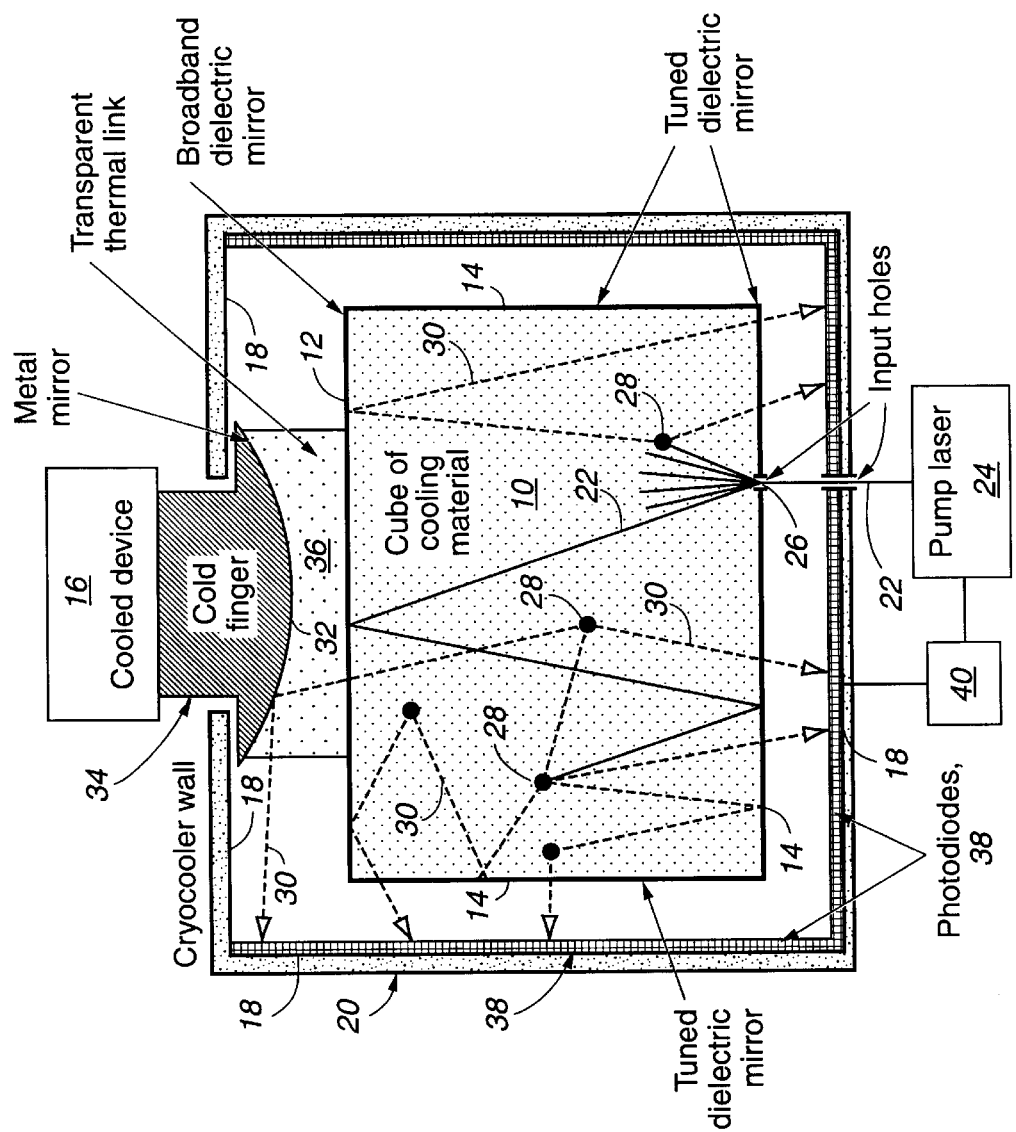
FIG. 3 is a schematic representation of a side view of a third embodiment of the present optical refrigerator which is similar to that shown in FIG. 2 hereof, except that the working material is rectangular in shape and has reflectivity-tuned dielectric mirrors on five of its sides, the sixth side having a broad-band reflective surface to prevent either the pump radiation or the fluorescence radiation from reaching the object being cooled, and photodiodes are disposed facing these five surfaces.

FIG. 3 is a schematic representation of a side view of a third embodiment of the optical cooler of the present invention illustrating the situation where cooling material 10 is in the shape of a cube with reflectivity-tuned dielectric mirrors 14 on five sides. Dielectric mirror 12 remains a broadband-reflectivity mirror to prevent significant amounts of radiation from impinging upon the object 16 being cooled. In this embodiment, higher-energy radiation can escape through all five sides coated having reflectivity-tuned mirrors. The five surfaces of the cooling chamber facing the tuned mirrors also support photodiodes 38. An advantage of this embodiment is that there are no uncoated surfaces through which the lower-energy radiation can escape.

Having generally described the invention, the following EXAMPLE provides additional details thereof.

EXAMPLE

Figure 4:
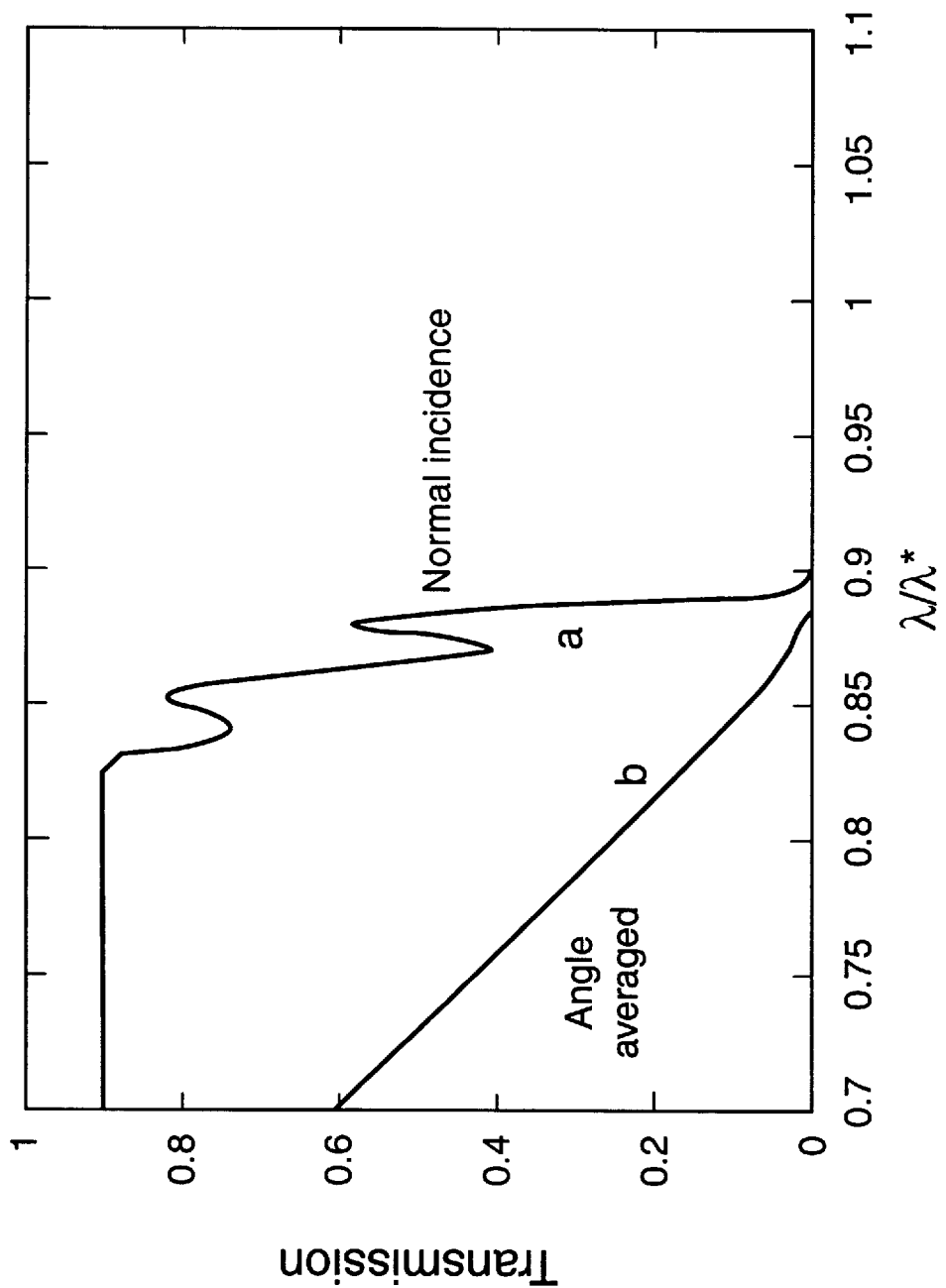
FIG. 4 shows the band-pass characteristics of the dielectric mirror intended to be employed in the apparatus illustrated in FIGS. 1–3 hereof, for normal incidence radiation (Curve a) and for escaping fluorescence radiation (Curve b).

FIG. 4 shows the characteristics of a commercially available short-bandpass mirror. Curve a shows the transmission for normal incidence radiation. The characteristic wavelength, $\lambda^*$, can be chosen in the range 0.8 to 1.4 microns. Curve b is the computed transmission function for the escaping fluorescence radiation for radiation within 45° of the normal; radiation at larger angles is trapped by total internal reflection. When this filter is used to modify the fluorescent radiation from Yb-doped ZBLAN glass (the material anticipated to be used in the present optical refrigerator), the mean fluorescent wavelength of the escaping radiation is modified.

Figure 5:
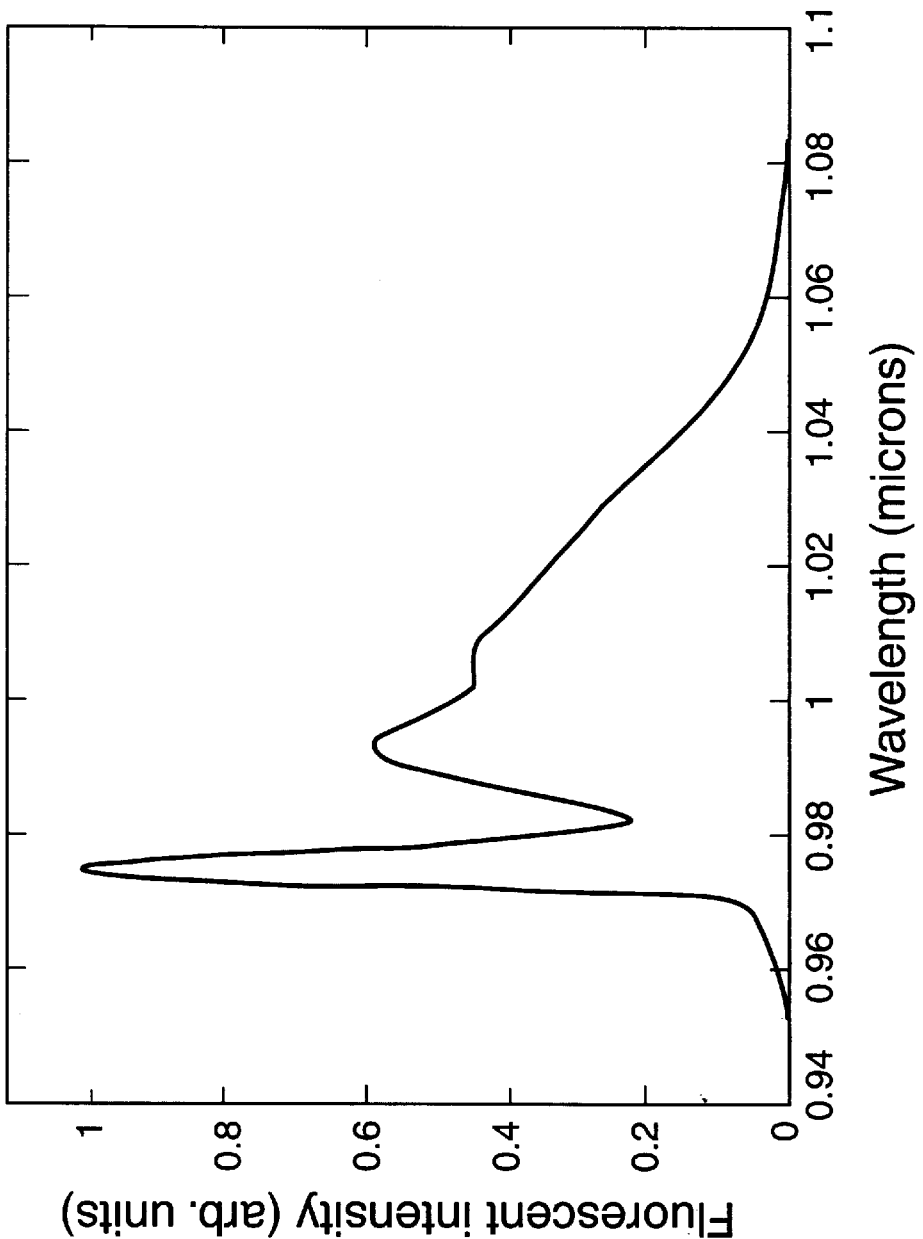
FIG. 5 shows the fluorescence spectrum of Yb-doped ZBLAN glass at 75K without using the filter described in FIG. 4 hereof.

FIG. 5 shows the fluorescent spectrum of the Yb-doped ZBLAN glass at 75K without the filter. This temperature is selected since known, commercially interesting cooling applications occur at this temperature.

Figure 6:
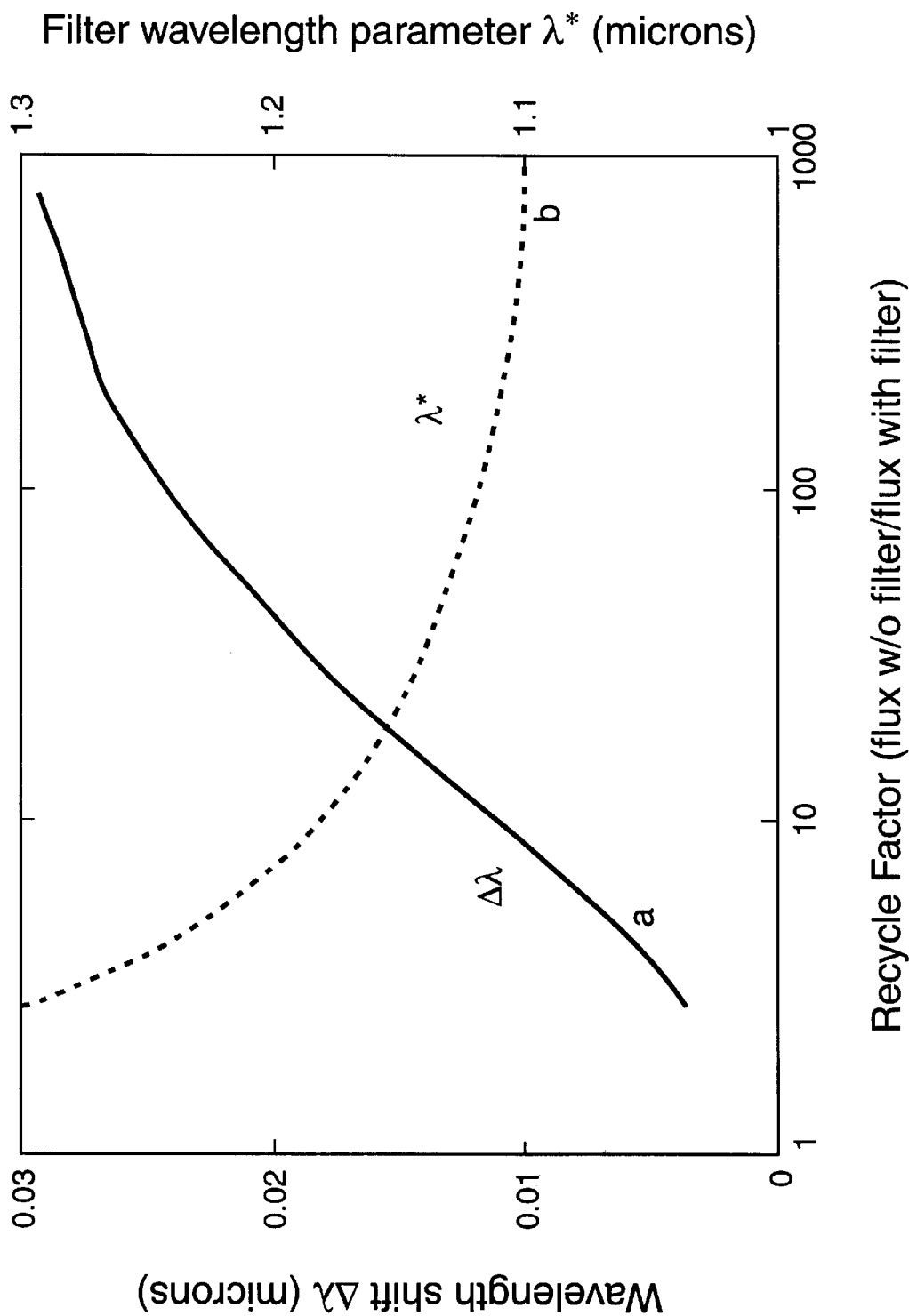
FIG. 6 shows the shift ($\Delta\lambda$) in the mean fluorescence wavelength of the escaping radiation achieved for values of the characteristic wavelength of the tuned dielectric mirror, $\lambda^*$, between 1.1 and 1.3 $\mu$m as a function of the Recycle Factor, which is the factor by which the escaping fluorescence radiation is reduced by the reflectivity-tuned dielectric mirror (Curve a), and $\lambda^*$ as a function of the Recycle Factor (Curve b).

FIG. 6 shows the shift in the mean fluorescent wavelength of the escaping radiation achieved for values of $\lambda^*$ between 1.1 and 1.3 $\mu$m (Curve b). The abscissa of this plot is the "Recycle Factor" (RF) which is the amount by which fluorescent radiation is reduced by the short-pass filter. The greater this number, the greater the probability that the fluorescent radiation will be absorbed and refluoresce before it escapes (and hence the greater the probability for nonradiative processes to deteriorate the cooling capacity of the refrigerator). Refrigerators having an RF in the range between 10 and 100 are expected to be practical. Curve a shows the mean fluorescence wavelength shift ($\Delta\lambda$) at 75K using a reflectivity-tuned mirror as a function of RF.

Figure 7:
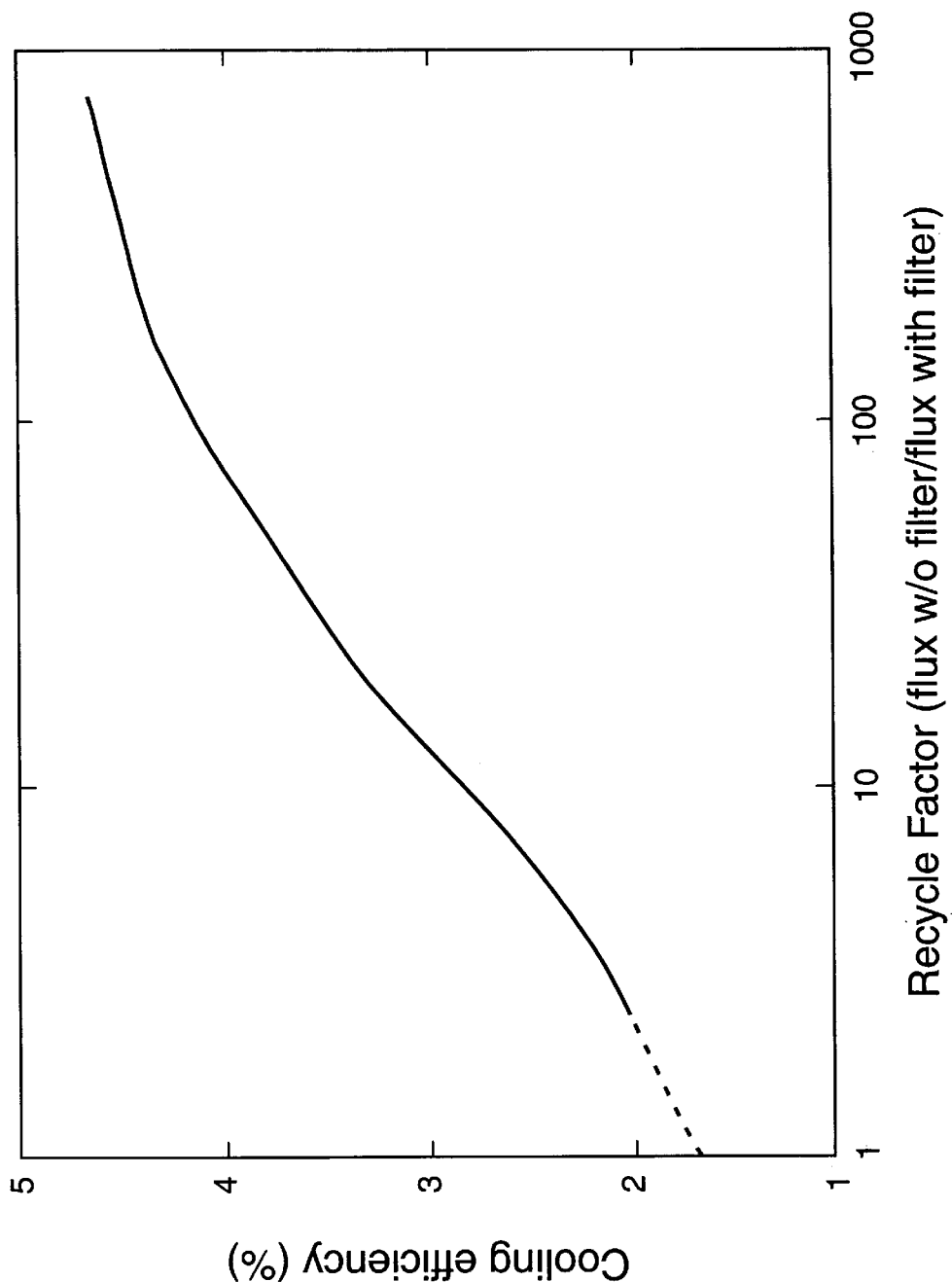
FIG. 7 shows the increase in the efficiency of the optical refrigerator as a function of the Recycle Factor for operation at 75K.

FIG. 7 shows the change in the device efficiency as a function of the RF for operation at 75K. The efficiency plotted here is the ratio of optical power to cooling power. The efficiency at RF=1 corresponds to the absence of a filter. This Figure shows that the efficiency of the refrigerator would double by using tuned mirrors having an RF of 30($\lambda^*$=1.18 $\mu$m).

Photocells increase the performance of the optical refrigerator by converting some of the fluorescent radiation to electricity. Defining $\eta_{e\text{-}1}$ as the efficiency for converting electricity to light in a semiconductor laser diode and $\eta_{1\text{-}e}$ as the efficiency for converting light to electricity in the photocell, the overall improvement in the refrigerator's efficiency by utilizing photocells is $(1-\eta_{e\text{-}1}\eta_{1\text{-}e})^{-1}$.

Figure 8:
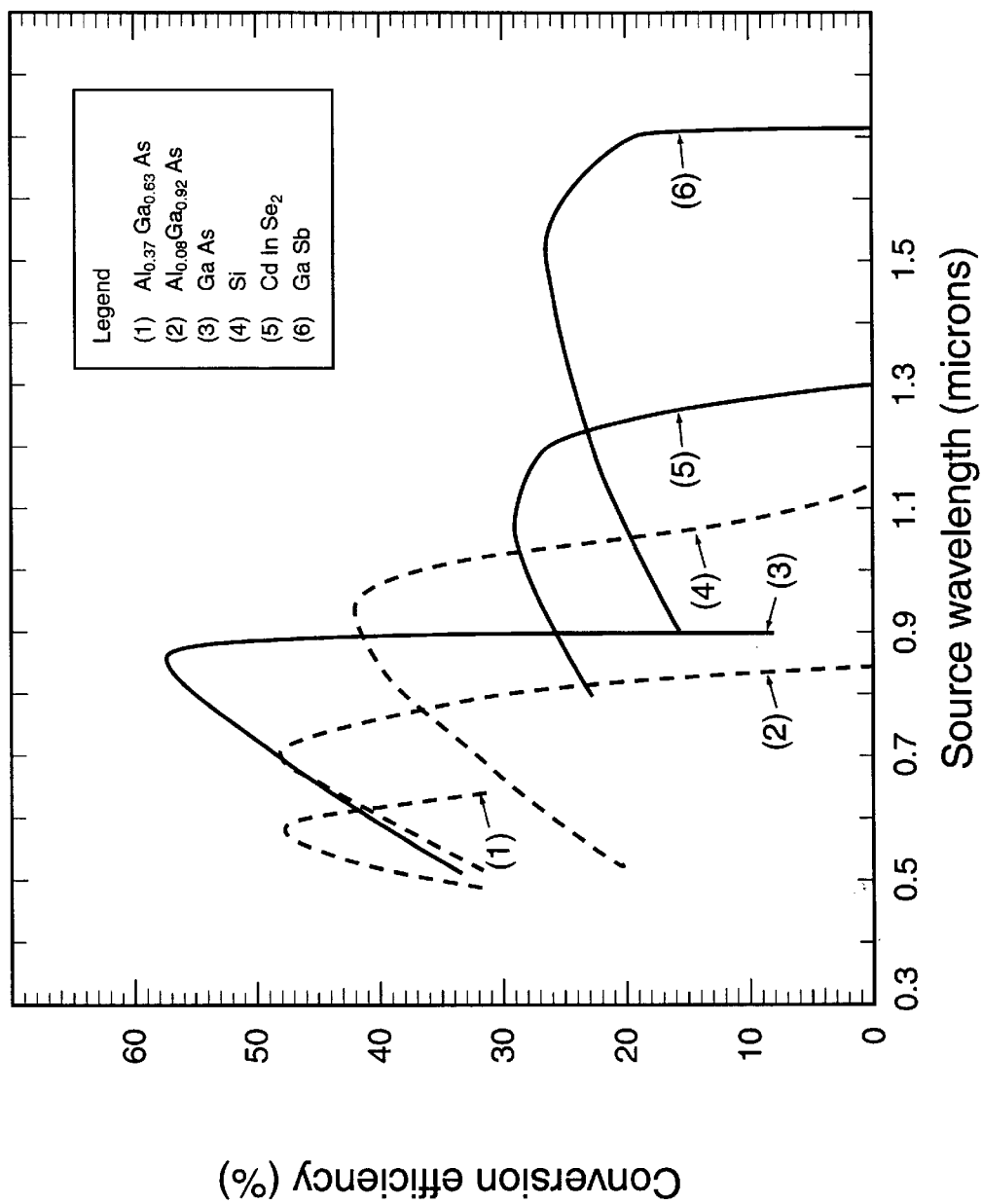
FIG. 8 shows the power conversion efficiencies for different photocell types as a function of incident wavelength of light.

FIG. 8 shows the conversion efficiencies versus source wavelength for photocells for several materials (See, e.g., Conference Record of the Twenty-First IEEE Photovoltaic Specialist Conference—1990, Vol. 1). It is seen that for a Yb:ZBLAN-based optical refrigerator with fluorescence near 1 micron, the light-to-electricity conversion efficiency ($\eta_{1-e}$) can be 28% (the specific example of an ytterbium-based cooler with 1% doping is described in U.S. Pat. No. 5,447,032, supra, where the working material would be about 0.3 cm thick and the division between high- and low-energy is near 970 nm). In a refrigerator using other materials such as GaAsAl, the fluorescence may be near 0.85 μm and a light-to-electricity conversion efficiency ($\eta_{1-3}$) can be 57%. The electricity-to-light efficiency of diode lasers in current commercial devices is >50%, and 66% has been achieved in the laboratory (See, e.g., Laser Focus World 33, 15 (Jan. 1997)). Using the latter value, the incorporation of photocells would increase the efficiency of a Yb:ZBLAN optical refrigerator by 23%. For refrigerators using materials that fluoresce near 0.85 μm, photocells could increase the efficiency by 62%, and the locally produced heat at the cooling chamber walls is reduced by $\eta_{1-e}$>57%.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for cooling an object, which comprises in combination:
    (a) means for generating substantially monochromatic light having a chosen wavelength;
    (b) a working material having atoms with energy levels such that at most a small number of energy levels in an excited state thereof are directly excited by the chosen wavelength of light from the ground energy level of the atoms, such that the energy levels in the excited state which are not directly excited have an energy spacing whereby they thermally redistribute, and such that fluorescence to the ground state can preferentially occur from the thermally redistributed energy levels, whereby the average fluorescence wavelength to the ground state level is shorter than the chosen wavelength of light, said working material further having a first dielectric-coated, substantially flat face and a second dielectric-coated, substantially flat face spaced apart from and substantially parallel to the first face, wherein the distance between the first face and the second face is chosen such that the optical depth for the fluorescence therebetween is small, and wherein the dielectric coating on the first face is highly reflective for the chosen wavelength of light while having significant transmission for the shorter fluorescence wavelengths and high reflectivity for the longer wavelengths thereof, while the dielectric coating on the second face is highly reflective at wavelengths which include that of the chosen wavelength of light and the wavelengths of the fluorescence;
    (c) means for directing the light into said working material through an uncoated portion of the first face such that the optical pathlength of the light within said working material between the first face and the second face is large as a result of multiple reflections of the light between the dielectric coatings of the first face and the second face; and
    (d) means for bringing the object to be cooled into thermal contact with the dielectric coating on the second face of said working material.

2. The apparatus for cooling an object as described in claim 1, further comprising means for thermally isolating the object to be cooled and said working material from external heat sources.

3. The apparatus for cooling an object as described in claim 1, wherein said working material is substantially cylindrically shaped.

4. The apparatus for cooling an object as described in claim 3, wherein the height of said cylinder is chosen such that the probability that a fluorescence photon is absorbed in traversing the thickness of the cylinder is less than about 0.4.

5. The apparatus for cooling an object as described in claim 4, wherein the ratio of the diameter to the height of said cylindrically shaped working material is greater than about five.

6. The apparatus for cooling an object as described in claim 1, further comprising photocells disposed facing the dielectric coating on the first face for absorbing fluorescence exiting from said working material, whereby electrical energy is generated.

7. The apparatus for cooling an object as described in claim 1, wherein the dielectric coating on the first face has a reflectivity at the chosen wavelength $\geq 0.999$, a transmission for the high-energy portion of the fluorescence spectrum $\geq 80\%$, and a reflectivity for the lower-energy portion of the fluorescent spectrum $\geq 90\%$.

8. An apparatus for cooling an object, which comprises in combination:
    (a) means for generating substantially monochromatic light having a chosen wavelength;
    (b) a working material having atoms with energy levels such that at most a small number of energy levels in an excited state thereof are directly excited by the chosen wavelength of light from the ground energy level of the atoms, such that the energy levels in the excited state which are not directly excited have an energy spacing whereby they thermally redistribute, and such that fluorescence to the ground state can preferentially occur from the thermally redistributed energy levels, whereby the average fluorescence wavelength to the ground state level is shorter than the chosen wavelength of light, said working material further having at least one first dielectric-coated, substantially flat face and a second dielectric-coated, substantially flat face, the second dielectric-coated face being spaced apart from and substantially parallel to one first face of the at least one first faces, wherein the distance between the at least one first face and the second face parallel thereto is chosen such that the optical depth for the fluorescence therebetween is small, and wherein the dielectric coating on the at least one first face is highly reflective for the chosen wavelength of light while having significant transmission for the shorter fluorescence wavelengths and high reflectivity for the longer wavelengths thereof, while the dielectric coating on the second face is highly reflective at wavelengths which include that of the chosen wavelength of light and the wavelengths of the fluorescence;
    (c) means for directing the light into said working material through an uncoated portion of the one first face of the at least one first faces which is substantially parallel to the second face such that the optical pathlength of the light within said working material between the one first face of the at least one first faces and the second face is large as a result of multiple reflections of the light between the dielectric coatings of the one first face of the at least one first faces and the second face; and (d) means for bringing the object to be cooled into thermal contact with the dielectric coating on the second face of said working material.

9. The apparatus for cooling an object as described in claim 8, further comprising means for thermally isolating the object to be cooled and said working material from external heat sources.

10. The apparatus for cooling an object as described in claim 8, wherein said working material is substantially cube shaped.

11. The apparatus for cooling an object as described in claim 10, wherein the distance between the one first face of the at least one first faces which is substantially parallel to the second face and the second face is chosen such that the probability that a fluorescence photon is absorbed in traversing the thickness of the cylinder is less than about 0.4.

12. The apparatus for cooling an object as described in claim 8, further comprising photocells disposed facing the dielectric coating on the at least one first face for absorbing fluorescence exiting from said working material, whereby electrical energy is generated.

13. The apparatus for cooling an object as described in claim 8, wherein the dielectric coating on the at least one first face has a reflectivity at the chosen wavelength $\geq 0.999$, a transmission for the high-energy portion of the fluorescence spectrum $\geq 80\%$, and a reflectivity for the lower-energy portion of the fluorescent spectrum $\geq 90\%$.

* * * * *